US008862742B2

(12) United States Patent
Livyatan et al.

(10) Patent No.: US 8,862,742 B2
(45) Date of Patent: Oct. 14, 2014

(54) COMMUNICATIONS SERVICE BROKER FOR ORCHESTRATION OF SERVICES IN A TELECOMMUNICATIONS NETWORK

(75) Inventors: Tzach Livyatan, Tel Aviv (IL); Ayal Itzkovitz, Haifa (IL); Tal Zoller, Haifa (IL); Nadav Kadosh, Givatayim (IL); Shlomo Livne, Ra'anana (IL)

(73) Assignee: Oracle International Corporation, Redwood Shores, CA (US)

( * ) Notice: Subject to any disclaimer, the term of this patent is extended or adjusted under 35 U.S.C. 154(b) by 440 days.

(21) Appl. No.: 13/330,567

(22) Filed: Dec. 19, 2011

(65) Prior Publication Data

US 2012/0158970 A1    Jun. 21, 2012

Related U.S. Application Data

(60) Provisional application No. 61/425,692, filed on Dec. 21, 2010.

(51) Int. Cl.
| | |
|---|---|
| *G06F 15/173* | (2006.01) |
| *H04W 4/00* | (2009.01) |
| *H04W 40/00* | (2009.01) |
| *G06F 17/00* | (2006.01) |
| *H04Q 3/00* | (2006.01) |
| *H04W 4/24* | (2009.01) |
| *H04M 15/00* | (2006.01) |
| *H04W 4/16* | (2009.01) |

(52) U.S. Cl.
CPC .............. *H04Q 3/0045* (2013.01); *H04W 4/24* (2013.01); *H04W 4/16* (2013.01); *H04M 15/55* (2013.01); *H04M 15/00* (2013.01)
USPC ............ 709/226; 455/433; 455/445; 705/400

(58) Field of Classification Search
None
See application file for complete search history.

(56) References Cited

U.S. PATENT DOCUMENTS

| | | | |
|---|---|---|---|
| 2007/0197213 A1* | 8/2007 | Weintraub et al. ............ 455/433 |
| 2007/0243875 A1 | 10/2007 | Gouthama et al. | |
| 2009/0117880 A1 | 5/2009 | Sipher | |
| 2010/0144344 A1* | 6/2010 | Jiang ............................. 455/433 |
| 2010/0197268 A1* | 8/2010 | Raleigh ........................ 455/408 |
| 2011/0039518 A1* | 2/2011 | Maria ........................... 455/406 |
| 2011/0045805 A1 | 2/2011 | Elkarat et al. | |
| 2012/0100849 A1* | 4/2012 | Marsico ..................... 455/432.1 |
| 2012/0129488 A1* | 5/2012 | Patterson et al. ............ 455/406 |
| 2013/0171974 A1* | 7/2013 | Bae ............................... 455/411 |

FOREIGN PATENT DOCUMENTS

| | | |
|---|---|---|
| EP | 1777871 | 4/2007 |
| EP | 2 197 237 | 6/2010 |
| WO | 92/17950 | 10/1992 |
| WO | 2008/088913 | 7/2008 |
| WO | WO2009108188 | 9/2009 |

OTHER PUBLICATIONS

International Search Report and Written Opinion dated Feb. 21, 2012, International Application No. PCT/US2011/066244, 8 pgs.

(Continued)

*Primary Examiner* — Ranodhi Serrao
(74) *Attorney, Agent, or Firm* — Meyer IP Law Group

(57) ABSTRACT

A service broker is described that performs orchestration of services to enable compilations of multiple applications for a single call or session. In particular, the service broker is extended with charging orchestration which allows the service broker to receive a single charging event and to orchestrate between activation of multiple charging services in response to the charging event.

19 Claims, 4 Drawing Sheets

(56) References Cited

OTHER PUBLICATIONS

International Search Report dated Jun. 20, 2012 for Application No. PCT/US2011/066240, 10 pages.

Joyce B. Mwangama et al., "Charging and Billing for Composite Services in a Multi-Service Provider Environment: The IMS Case", Wireless Communications and Networking Conference (WCNC), 2010 IEEE, IEEE, Piscataway, NJ, USA, Apr. 18, 2010.

* cited by examiner

COMMUNICATIONS SERVICE BROKER FOR ORCHESTRATION OF SERVICES IN A TELECOMMUNICATIONS NETWORK

CLAIM OF PRIORITY

The present application claims the benefit of the following U.S. Provisional Patent Application, which is incorporated by reference herein in its entirety:

U.S. Provisional Patent Application No. 61/425,692, entitled "COMMUNICATIONS SERVICE BROKER FOR MEDIATION AND ORCHESTRATION OF SERVICES IN THE TELECOMMUNICATIONS NETWORK," by Tzach Livyatan et al., filed on Dec. 21, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and in particular to providing service orchestration in the telecom network.

BACKGROUND

Given the recent dramatic growth in wireless and cellular communications, more and more businesses and other entities are integrating themselves with mobile device technologies. In addition to standard voice features, modern cellular phones and similar devices provide countless other services, such as Internet access, electronic mail (email), short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new customers while retaining existing ones, develop profitable new business models, improve returns and launch new services as quickly as possible.

Faced with these challenges, most operators are drastically increasing services in their portfolio of content and application offerings. Many such new offerings require the operators to coordinate and mediate among a plurality of different applications in a single call, to translate between communications in differing protocols and to try to resolve any problems or inconveniences that may be caused. Additionally, many new applications are emerging which may utilize services from multiple types of networks and underlying technologies. What is needed is an improved way to manage and coordinate all of these underlying technologies and applications in a single cohesive manner.

BRIEF SUMMARY

A service broker is described that performs orchestration of services to enable compilations of multiple applications for a single call or session. In particular, the service broker is extended with charging orchestration which allows the service broker to receive a single charging event and to orchestrate between activation of multiple charging services in response to the charging event.

DETAILED DESCRIPTION

The embodiments of the present invention reside in the context of a communications service broker that can be utilized by a telecom network operator. The service broker performs mediation between applications (service logic) and different networks, as well as orchestration of services to enable compilations of multiple applications for a single call or session. The mediation feature provides applications with access to switching and session call control layers in different network domains, together with the required protocol. The orchestration of services enables different types of applications to work together to build new composite service offerings within the context of a single call.

In accordance with an embodiment, the service broker is extended with the ability to orchestrate charging events between different charging services, including combination legacy and IP Multimedia System (IMS)/Long term evolution (LTE) services. This can allow the service broker to receive a single charging event from the telecom network and to orchestrate the activation of multiple charging services on the services side. In accordance with an embodiment, the charging orchestration is performed in an orchestration engine within the service broker. The charging engine can include charging logic stored in an extensible markup language (XML) document either locally or remotely accessible by the orchestration engine. In an embodiment, the orchestration engine receives a charging event from the network, inspects the XML file and the parameters of the event and using this information in combination with the subscriber information, the orchestration engine orchestrates which charging services to invoke in response to the charging event.

Figure 1:
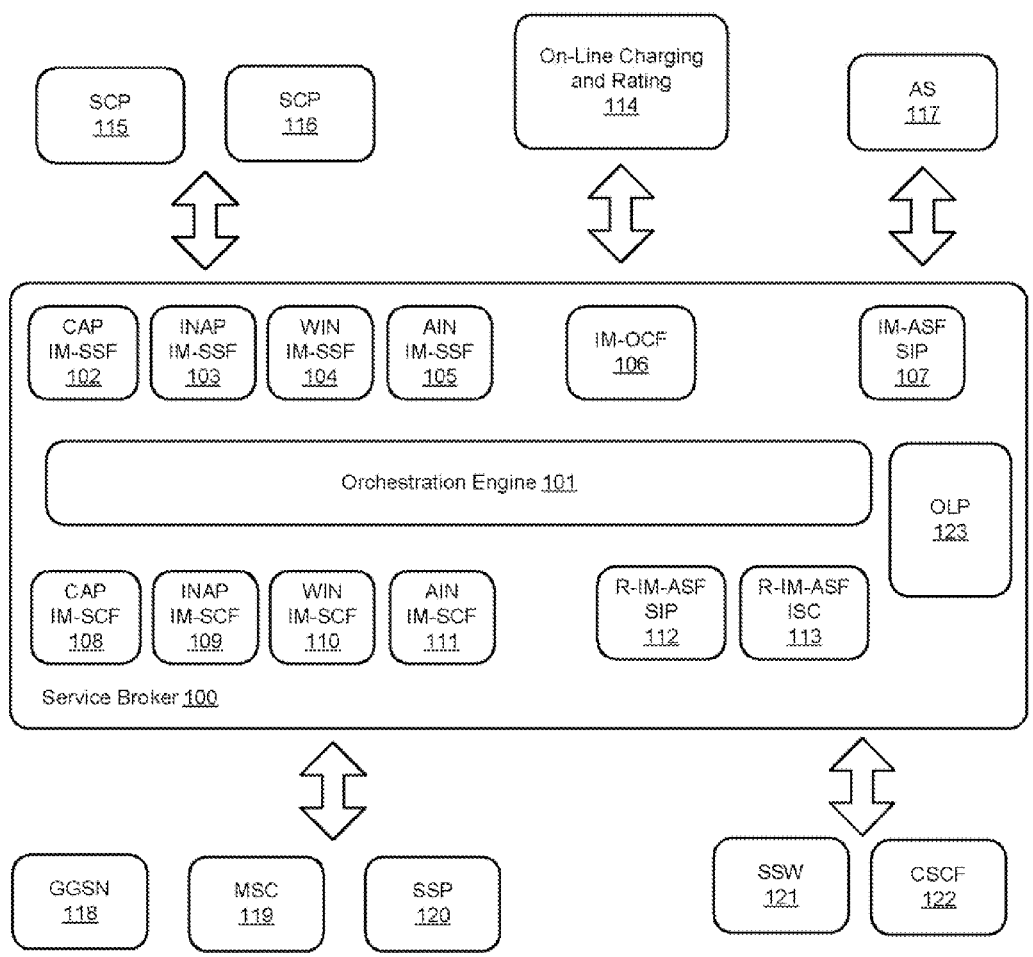
FIG. 1 is an illustration of a service broker, in accordance with various embodiments of the invention.

FIG. 1 is an illustration of the service broker in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the service broker 100 can be positioned between telecom network resources such as the Gateway GPRS Support Node (GGSN) 118, Mobile Switching Center (MSC) 119, Service Switching Points (SSP) 120, call session control function (CSCF) 122 and Soft Switch (SSW) 121 and the various other services such as service control points (SCPs) 115, 116, On-line Charging and Rating systems 114, and Application Servers (AS) 117. In accordance with an embodiment, the service broker is used to manage service interactions and composition between the services and evolving network layers. The service broker includes an orchestration engine and a set of interworking modules to aid with migrating services from legacy platforms, launching new services that blend legacy and IP networks with the IT domain, and consolidating service and charging platforms across multiple network types. Network operators can implement a service broker to bridge services from legacy IN-based to next generation IP-based networks. Service Broker mediates services across diverse network types and orchestrates multiple services in realtime, enabling the creation of blended services.

In accordance with the illustrated embodiment, the Interworking Module (IM) components of Service Broker provide key IN orchestration functions for leveraging services across multiple network types to reduce redundant legacy service platforms. The IM components provide a common control model for mobile and fixed network protocols, enabling the Orchestration Engine 101 to control services delivered across various network domains. To support the differences between the underlying networks, network specific information is encapsulated in the IM components and relayed to existing, deployed application platforms. In accordance with the illustrated embodiment, the Service Broker provides the following IM components: Interworking Module Service Control Function (IM-ICF) 108, 109, 110, 111; Interworking Module Service Switching Function (IM-SSF) 102, 103, 104, 105; Interworking Module (IM) Online Charging Function (IM-OCF) 106; Interworking Module Application Server Function (IM-ASF) 107; and Reverse Interworking Module Application Server Function (R-IM-ASF) 112, 113. When combining the use of IN supporting interworking modules (IM-SCF, IM-SSF) and Session Initiation Protocol (SIP) supporting interworking modules (IM-ASF and R-IM-ASF), the Service Broker can provide orchestration between IMS application and existing legacy networks based applications. Additionally the service broker 100 includes orchestration logic processors (OLPs) 123 that control the orchestration of the various services.

In accordance with an embodiment, the Service Broker supports real-time, converged charging capabilities through a dedicated IM-OCF module 106. In conjunction with other IM modules, the IM-OCF 106 allows common real-time charging for postpaid, prepaid, or hybrid charging models within both IN and IP based networks.

Figure 2:
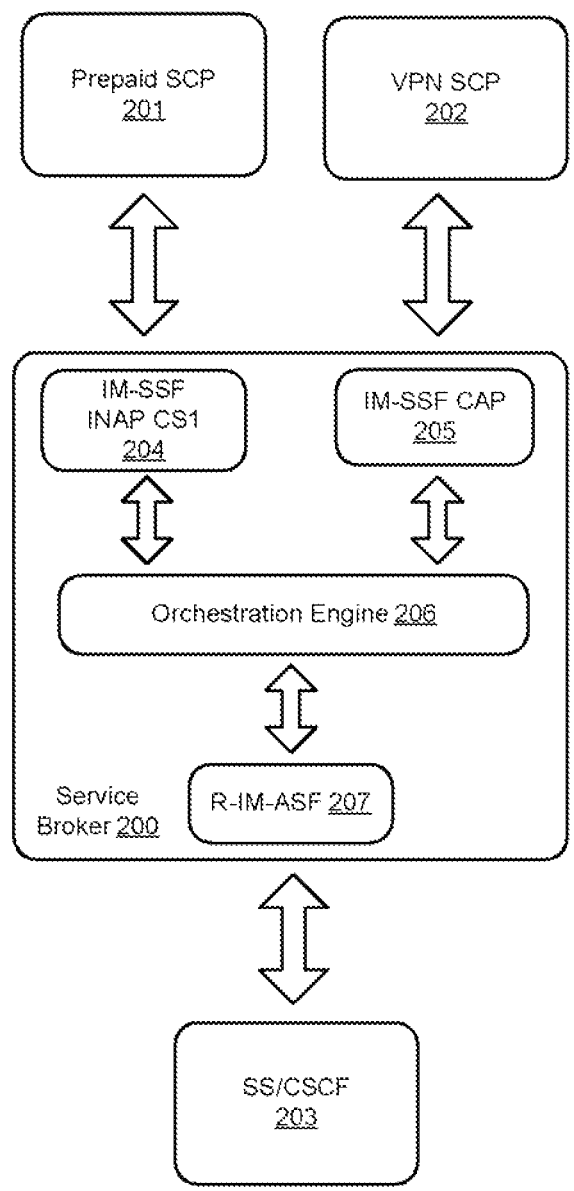
FIG. 2 is an illustration of charging orchestration being performed by the communications service broker, in accordance with various embodiments of the invention.

FIG. 2 is an illustration of charging orchestration being performed by the communications service broker, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the Service Broker 200 includes an orchestration engine 206 that is responsible for orchestration of services, including the charging orchestration. In accordance with an embodiment, the orchestration engine can detect an orchestration event originating in the network resource (e.g. SSW/CSCF 203) and can orchestrate several charging services 201, 202 to be invoked in response to the charging event. By way of example, the charging event can be received by way of R-IM-ASF 207 and the charging services can be invoked over IM-SSF INAP CS1 204 and the IM-SSF CAP 205. In this particular figure, the charging services are shown being prepaid SCP over the INAP protocol and VPN SCP over the CAP protocol. In alternative embodiments, the orchestration can be performed between various other charging services over different protocols.

In accordance with an embodiment, the orchestration engine is configured with an extensible markup language (XML) based rule file for performing charging events. When the orchestration engine receives an event from the network, it can inspect the parameters of the charging event (calling party, location, time of day, etc), inspect the XML rules for performing orchestration, review the subscriber's information and use all of this information to determine which charging services should be activated. The orchestration engine can then orchestrate the activation of each of these charging services in response to the charging event.

One possible use case for charging orchestration can involve a sponsor code for prepaid call services. In a typical prepaid scenario, every time a call is made by the subscriber, the subscriber's account is deducted a certain amount for the call. In a sponsor code scenario, when the call is made, a portion of the amount can be deducted from the subscriber's account using one charging service and another portion can be deducted from a sponsor's account by invoking a different charging service. This can allow sponsor companies to perform call based advertising and other marketing by utilizing the orchestration of charging services. In other alternative embodiments, the charging orchestration can be used in connection with other use cases and purposes.

Figure 3:
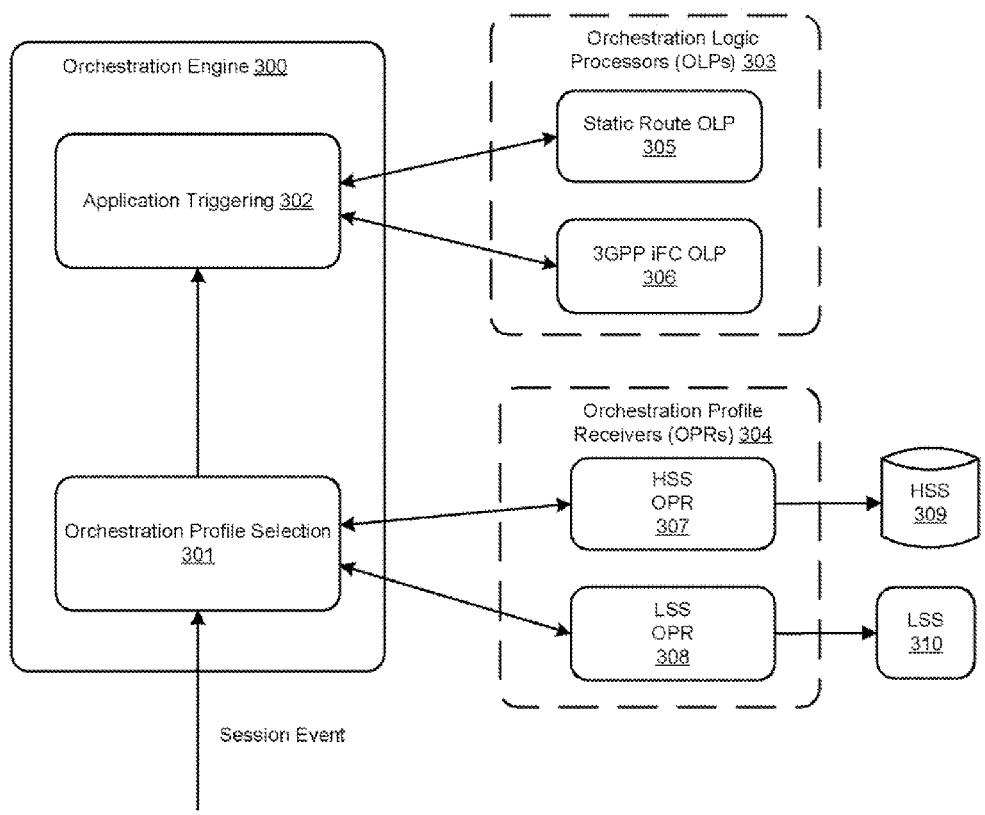
FIG. 3 is an illustration of the orchestration engine, in accordance with various embodiments of the invention.

FIG. 3 is an illustration of the orchestration engine, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the orchestration engine 300 is responsible for the delivery of multiple services per session. To perform service orchestration, the orchestration engine uses orchestration logic. Orchestration logic defines applications through which the orchestration engine should pass a session and the order in which these applications must be invoked. In accordance with an embodiment, service orchestration is performed using the following components: (1) Orchestration Profile Receivers (OPRs) 304 and (2) Orchestration Logic Processors (OLPs) 303.

In accordance with an embodiment, when triggered by the session control layer, the orchestration engine 300 performs the following procedure for each call or session:

a. Orchestration profile selection 301: the orchestration engine uses an OPR to select and retrieve an orchestration profile. The orchestration profile includes information on the type of OLP to use next, and the specific parameters that type of OLP requires. The orchestration engine can uses either a Home Subscriber Server (HSS)

OPR 307, Local Subscriber Server (LSS) OPR 308, or any other installed OPR as defined in the orchestration engine's configuration settings. These OPRs can in turn maintain a connection to the HSS 309 or LSS 310.

b. Application triggering 302: The orchestration engine interacts with an OLP component. The type of the OLP is specified by the OPR that was used in the previous step. For example, the OLPs can include a static route OLP 305 or the 3GPP iFC OLP 306. Using the information included in the profile, the OLP obtains orchestration logic, processes the orchestration logic and determines which application to trigger next. Once an application is selected by the OLP, the orchestration engine routes the session towards that application and waits for the application to return.

c. When the session returns, the orchestration engine continues processing the orchestration logic, looking for the next application to trigger. This process repeats until orchestration is completed. At this stage the orchestration engine routes the session back to the session control entity.

In accordance with an embodiment, when the orchestration engine triggers an OPR, the OPR responds with an orchestration profile. This is performed by the OPR (1) connecting to a profile server that holds subscriber data and orchestration profiles (e.g. HSS, LSS), (2) selecting an orchestration profile using session information (e.g. session origination, session destination and IN Service Key), (3) obtaining the orchestration profile and forwarding it to the orchestration engine.

In accordance with various embodiments, different OPRs 304 connect to different sources of subscriber data and orchestration profiles. By way of example, the service broker can include an HSS Orchestration Profile Receiver 307 and an LSS Orchestration Profile Receiver 308. The Home Subscriber Server (HSS) is the primary user database in the IMS domain. It contains subscription-related information including subscriber applications and orchestration profiles. The HSS OPR uses the Diameter protocol over the standard Sh interface to connect the HSS and select orchestration profile. The service broker can also include an on-board implementation of a profile server, called Local Subscriber Server (LSS). The LSS is capable of storing subscriber profiles, including orchestration logic given in the Initial Filter Criteria (iFC) format. The LSS OPR connects the LSS to look up subscriber profiles with orchestration logic. Furthermore, the service broker may employ a Default Orchestration Profile Receiver. When this OPR is used, the orchestration engine does not retrieve an orchestration profile from an external server. Instead, the OE triggers the Static Route OLP with its pre-configured orchestration logic.

In accordance with various embodiments, Orchestration Logic Processors (OLPs) 303 obtain orchestration logic and process it in order to determine which applications to invoke and in which order. The OLP is triggered by the orchestration engine. It uses profile data and provides the address of the application that needs to be invoked in return. When the application finishes its processing and returns to the orchestration engine, the engine triggers the OLP again to receive the address of the next application to invoke. Different OLPs are used to process different formats of profiles and orchestration logic rules. The service broker can include an initial Filter Criteria (iFC) OLP and a static route OLP. Initial Filter Criteria (iFC) is a standard format for specifying orchestration logic, specified in ETSI TS 129 228 V7.11.0, IP Multimedia (IM) Subsystem Cx and Dx Interfaces. iFC is a set of rules in XML format, composed of conditions (Trigger Points) and application servers that will be invoked if a condition is met. The conditions are given in logic expressions and can be applied on the content fields within the session. The Static Route OLP uses a preconfigured list of applications to determine which applications to invoke and in which order. It is also possible to add new OLPs to the service broker to support additional formats of orchestration logics.

Figure 4:
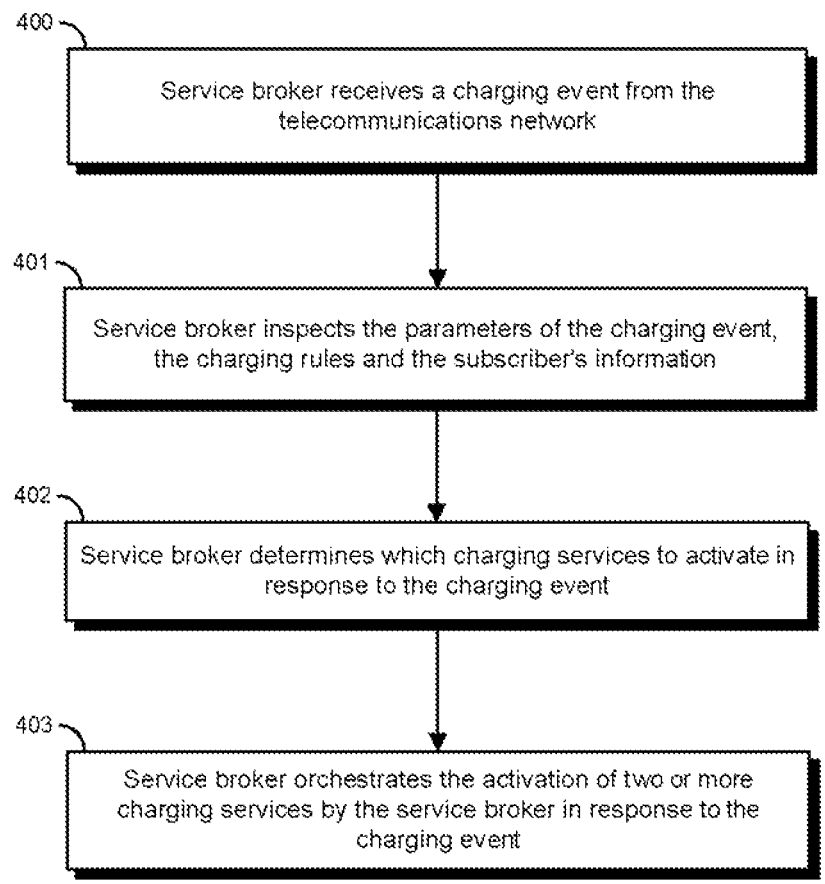
FIG. 4 is a flow chart illustration of a process for performing charging orchestration, in accordance with various embodiments of the invention.

FIG. 4 is a flow chart illustration of a process for performing charging orchestration, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, the service broker can receive a charging event that originated in the telecom network. The service broker can then inspects the parameters of the charging event, as well as check the charging rules and the subscriber's information (step 401) in order to determine which charging services to activate in response to the charging event (step 402). Based on this information, the service broker can orchestrate the activation of two or more charging services by the service broker in response to the charging event (step 403).

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for performing a charging orchestration in a telecommunications environment, said method comprising:
   receiving, by a service broker operating on one or more microprocessors, a charging event from a telecommunications network;
   inspecting, by the service broker, a plurality of parameters of the charging event, a plurality of charging rules and information associated with a subscriber that issues the charging event, wherein the plurality of charging rules are stored in a file and define how to perform charging orchestration;
   determining an amount to be charged for the charging event and which charging services to activate in response to the charging event; and
   deducting the amount from a plurality of charging accounts, wherein a portion of the amount is deducted from each said charging account by invoking a different said charging service;
   wherein the service broker further includes one or more Orchestration Logic Processors (OLPs) that obtain orchestration logic and process the orchestration logic in order to determine which applications to invoke in a particular order; and
   wherein said charging event includes a sponsor code for prepaid call services, and when the charging event is received, a portion of the amount determined for said charging event is deducted from the subscriber's account using one charging service and another portion is deducted from an account of a sponsor associated with the sponsor code by invoking a different charging service.

2. The method of claim 1, wherein the charging services include a combination of legacy and IP Multimedia System (IMS) / Long term evolution (LTE) services.

3. The method of claim 1, wherein the file is an extensible markup language (XML) document stored in an orchestration engine in the service broker.

4. The method of claim 1, wherein orchestrating said activation of the services enables different types of applications to build a composite service offering within the context of a single call.

5. The method of claim 1, wherein the service broker further includes one or more orchestration profile receivers (OPRs) that select and retrieve an orchestration profile.

6. The method of claim 5, wherein the one or more OPRs connect to a profile server that holds subscriber data and orchestration profiles, select an orchestration profile using session information, obtain the orchestration profile and forward the orchestration profile to an orchestration engine.

7. The method of claim 1, wherein the orchestration logic defines applications through which a session should be passed and the order in which said applications must be invoked.

8. A system for performing charging orchestration in a telecommunications environment, said system comprising:
   a service broker that receives a charging event from a telecommunications network, inspects a plurality of parameters of the charging event, a plurality of charging rules and information associated with a subscriber that issues the charging event in order to determine an amount to be charged for the charging event and which charging services to activate in response to the charging event, wherein the plurality of charging rules are stored in a file and define how to perform charging orchestration; and
   an orchestration engine residing on said service broker that deduct the amount from a plurality of charging accounts, wherein a portion of the amount is deducted from each said charging account by invoking a different said charging service;
   wherein the service broker further includes one or more Orchestration Logic Processors (OLPs) that obtain orchestration logic and process the orchestration logic in order to determine which applications to invoke in a particular order; and
   wherein said charging event includes a sponsor code for prepaid call services, and when the charging event is received, a portion of the amount determined for said charging event is deducted from the subscriber's account using one charging service and another portion is deducted from an account of a sponsor associated with the sponsor code by invoking a different charging service.

9. The system of claim 8, wherein the charging services include a combination of legacy and IP Multimedia System (IMS) / Long term evolution (LTE) services.

10. The system of claim 8, wherein the file is an extensible markup language (XML) document stored in an orchestration engine in the service broker.

11. The system of claim 8, wherein orchestrating said activation of the services enables different types of applications to build a composite service offering within the context of a single call.

12. The system of claim 8, wherein the service broker further includes one or more orchestration profile receivers (OPRs) that select and retrieve an orchestration profile.

13. The system of claim 12, wherein the one or more OPRs connect to a profile server that holds subscriber data and orchestration profiles, select an orchestration profile using session information, obtain the orchestration profile and forward the orchestration profile to an orchestration engine.

14. The system of claim 8, wherein the service broker further includes orchestration logic that defines applications through which the a session should be passed and the order in which said applications must be invoked.

15. A non-transitory computer readable storage medium storing a sequence of instructions that are executable by one or more processors to perform a set of steps comprising:
   receiving, by a service broker operating on one or more microprocessors, a charging event from a telecommunications network;
   inspecting, by the service broker, a plurality of parameters of the charging event, a plurality of charging rules and information associated with a subscriber that issues the charging event, wherein the plurality of charging rules are stored in a file and define how to perform charging orchestration;
   determining an amount to be charged for the charging event and which charging services to activate in response to the charging event; and deducting the amount from a plurality of charging accounts, wherein a portion of the amount is deducted from each said charging account by invoking a different said charging service;

wherein the service broker further includes one or more Orchestration Logic Processors (OLPs) that obtain orchestration logic and process the orchestration logic in order to determine which applications to invoke in a particular order; and wherein said charging event includes a sponsor code for prepaid call services, and when the charging event is received, a portion of the amount determined for said charging event is deducted from the subscriber's account using one charging service and another portion is deducted from an account of a sponsor associated with the sponsor code by invoking a different charging service.

16. The non-transitory computer readable storage medium of claim 15, wherein the charging services include a combination of legacy and IP Multimedia System (IMS) / Long term evolution (LTE) services.

17. The non-transitory computer readable storage medium of claim 15, wherein the file is an extensible markup language (XML) document stored in an orchestration engine in the service broker.

18. The non-transitory computer readable storage medium of claim 15, wherein orchestrating said activation of the services enables different types of applications to build a composite service offering within the context of a single call.

19. The non-transitory computer readable storage medium of claim 15, wherein the service broker further includes one or more orchestration profile receivers (OPRs) that select and retrieve an orchestration profile.

* * * * *

UNITED STATES PATENT AND TRADEMARK OFFICE
CERTIFICATE OF CORRECTION

PATENT NO. : 8,862,742 B2
APPLICATION NO. : 13/330567
DATED : October 14, 2014
INVENTOR(S) : Livyatan et al.

It is certified that error appears in the above-identified patent and that said Letters Patent is hereby corrected as shown below:

In the Claims

In column 8, line 51, in Claim 14, delete "the a" and insert -- a --, therefor.

Signed and Sealed this
Twenty-eighth Day of April, 2015

Michelle K. Lee
*Director of the United States Patent and Trademark Office*